(12) United States Patent
Kwon et al.

(10) Patent No.: US 8,355,090 B2
(45) Date of Patent: Jan. 15, 2013

(54) LIQUID CRYSTAL DISPLAY HAVING REDUCED KICKBACK EFFECT

(75) Inventors: Ji-Hyun Kwon, Seoul (KR); Hye-Seok Na, Seoul (KR); Won-Hee Lee, Seoul (KR); Ho-Kyoon Kwon, Seoul (KR); Byoung-Sun Na, Hwaseong-si (KR); Dong-Yoon Lee, Seoul (KR); Ju-Hee Lee, Cheonan-si (KR); Gwang-Bum Ko, Asan-si (KR)

(73) Assignee: Samsung Display Co., Ltd. (KR)

( * ) Notice: Subject to any disclaimer, the term of this patent is extended or adjusted under 35 U.S.C. 154(b) by 699 days.

(21) Appl. No.: 12/507,764

(22) Filed: Jul. 22, 2009

(65) Prior Publication Data

US 2010/0208157 A1 Aug. 19, 2010

(30) Foreign Application Priority Data

Feb. 13, 2009 (KR) .................. 10-2009-0012014

(51) Int. Cl.
*G02F 1/1343* (2006.01)
*G02F 1/136* (2006.01)
(52) U.S. Cl. .............................. 349/48; 349/38; 349/141
(58) Field of Classification Search ............... 349/38, 349/48, 141
See application file for complete search history.

(56) References Cited

U.S. PATENT DOCUMENTS

| | | | |
|---|---|---|---|
| 2008/0273131 A1* | 11/2008 | Kim | 349/38 |
| 2008/0278651 A1* | 11/2008 | Lee et al. | 349/43 |
| 2009/0244424 A1* | 10/2009 | Kim et al. | 349/48 |
| 2009/0256985 A1* | 10/2009 | Jung et al. | 349/48 |
| 2010/0053488 A1* | 3/2010 | Kim et al. | 349/48 |

FOREIGN PATENT DOCUMENTS

| | | |
|---|---|---|
| JP | 09-090403 | 4/1997 |
| JP | 2001-175214 | 6/2001 |
| JP | 2002-132221 | 5/2002 |
| JP | 2007-133054 | 5/2007 |
| KR | 2001-0036715 | 5/2001 |
| KR | 2001-0064411 | 7/2001 |
| KR | 2002-0033426 | 5/2002 |
| KR | 2002-0064397 | 8/2002 |

(Continued)

*Primary Examiner* — Huyen Ngo
(74) *Attorney, Agent, or Firm* — Innovation Counsel LLP

(57) ABSTRACT

A liquid crystal display (LCD), according to an exemplary embodiment of the present invention, includes a first pixel formed between the first and second gate lines, the first and the second data lines, a first subpixel configured to have applied thereto a first data voltage and a second subpixel configured to have applied thereto a second data voltage lower than the first data voltage, a second pixel formed between the second and third gate lines, the first and second data lines, and having a third subpixel configured to have applied thereto a third data voltage and a fourth subpixel configured to have applied thereto a fourth data voltage lower than the third data voltage. The first subpixel and the third subpixel are connected to a first thin film transistor and a third thin film transistor respectively, the first thin film transistor and the third thin film transistor have source electrodes connected to the first data line and the second data line respectively, and each of the source electrodes has an open portion surrounding a portion of a drain electrode, and wherein an open direction of the source electrode of the first thin film transistor is opposite to an open direction of the source electrode of the third thin film transistor.

13 Claims, 11 Drawing Sheets

| | FOREIGN PATENT DOCUMENTS | | KR | 2007-0005983 | 1/2007 |
|---|---|---|---|---|---|
| KR | 2005-0001742 | 1/2005 | KR | 2007-0088236 | 8/2007 |
| KR | 2005-0060292 | 6/2005 | | | |
| KR | 2006-0130881 | 12/2006 | * cited by examiner | | |

LIQUID CRYSTAL DISPLAY HAVING REDUCED KICKBACK EFFECT

CROSS-REFERENCE TO RELATED APPLICATIONS

This application claims priority to and the benefit of Korean Patent Application No. 10-2009-0012014, filed in the Korean Intellectual Property Office on Feb. 13, 2009, the entire contents of which are incorporated herein by reference.

BACKGROUND

1. Technical Field

The present invention relates to a liquid crystal display and a manufacturing method thereof.

2. Related Art

A liquid crystal display (LCD) is a type of flat panel display (FPD) having two display panels with field generating electrodes, such as pixel electrodes and a common electrode, and a liquid crystal layer interposed between the two display panels. In the LCD, voltages are applied to the field generating electrodes so as to generate an electric field over the liquid crystal (LC) layer, and then the alignment of LC molecules of the LC layer is determined by the electric field. Accordingly, the polarization of incident light is controlled, thereby performing image display.

Among the LCDs, a vertical alignment (VA) mode LCD, which aligns LC molecules such that their long axes are perpendicular to the panels in the absence of an electric field, is spotlighted because of its high contrast ratio and wide reference viewing angle. In the VA mode LCD, to obtain the wide viewing angle, a plurality of domains in which the alignment directions of the LC molecules are different may be formed in one pixel.

Methods in which a minute slit or a cutout is formed in the field generating electrodes or a protrusion is formed on the field generating electrodes have been proposed as means for forming the plurality of domains in one pixel. In this method, the plurality of domains may be formed by aligning the LC molecules vertically with respect to a fringe field generated between the edges of the cutout or the protrusion and the field generating electrodes facing the edges. On the other hand, the LCD of the VA mode has lower lateral visibility compared with frontal visibility such that one pixel is divided into two subpixels and different voltages are applied to the subpixels to solve this problem.

It should be appreciated that the above information disclosed in this Background section is only for enhancement of understanding of the background of the invention and therefore it may contain information that does not form the prior art that is already known in this country to a person of ordinary skill in the art.

SUMMARY

A liquid crystal display (LCD), according to an exemplary embodiment of the present invention, includes a plurality of pixels arranged in a matrix shape, each of the pixels having a first subpixel and a second subpixel, wherein the pixels respectively include a first thin film transistor transmitting a first data voltage to the first subpixel, the first thin film transistor having a first source electrode, a first drain electrode, and a first gate electrode, and a second thin film transistor transmitting a second data voltage to the second subpixel, the second thin film transistor having a second source electrode, a second drain electrode, and a second gate electrode, wherein a relative position of the first drain electrode with respect to the first source electrode is opposite to a relative position of the second drain electrode with respect to the second source electrode in each pixel.

The first source electrode may be disposed on a left side of the first drain electrode and the second source electrode may be disposed on a right side of the second drain electrode, with reference to a length direction of the pixel. The first source electrode may include a first open portion enclosing a portion of the first drain electrode, the second source electrode may include a second open portion enclosing a portion of the second drain electrode, and an open direction of the first open portion may be opposite to an open direction of the second open portion. A first data line and a second data line respectively disposed on a first side and a second side of each pixel column among the pixels may be further included. With reference to a length direction of the pixel, right and left positions of the first thin film transistor and the second thin film transistor of two pixels neighboring in at least one direction of a row direction and a column direction may be opposite to each other for the two pixels. The first source electrode of one pixel of two pixels neighboring in at least one direction of a row direction and a column direction among the pixels may be connected to the first data line, and the first source electrode of the other pixel may be connected to the second data line. The first data voltage and the second data voltage may have different magnitudes and may be obtained from one image information.

A method for manufacturing a liquid crystal display including a plurality of pixels arranged in a matrix shape, each of the pixels having first subpixel and a second subpixel, according to an exemplary embodiment of the present invention, includes: depositing a first conductive material layer on a substrate; coating a first photosensitive film on the first conductive material layer; forming a first gate electrode and a second gate electrode by aligning a first photomask over the first photosensitive film and exposing the first photosensitive film to light by using a light exposer scanning the first photosensitive film; and depositing a second conductive material layer on the first gate electrode and the second gate electrode; coating a second photosensitive film on the second conductive material layer, and forming a first drain electrode partially overlapping the first gate electrode, a second drain electrode partially overlapping the second gate electrode, a first source electrode facing the first drain electrode, and a second source electrode facing the second drain electrode by aligning a second photomask over the second photosensitive film and exposing the second photosensitive film to light by using the light exposer scanning the second photosensitive film. The first gate electrode, the first source electrode, and the first drain electrode may form a first thin film transistor of the first subpixel, and the second gate electrode, the second source electrode, and the second drain electrode form a first thin film transistor of the second subpixel, and wherein an acute angle between a scanning direction of the light exposer and at least one of a first boundary line a second boundary line is more than 45 degrees and is equal to or less than 90 degrees, the first boundary line being a boundary line between the portion at which the first drain electrode and the first gate electrode overlap each other and the portion at which the first drain electrode and the first gate electrode do not overlap each other, the second boundary line being a boundary line between the portion at which the second drain electrode and the second gate electrode overlap each other and the portion that the second drain electrode and the second gate electrode do not overlap each other.

A relative position of the first drain electrode with respect to the first source electrode may be opposite to a relative position of the second drain electrode with respect to the second source electrode. The first source electrode may include a first open portion enclosing a portion of the first drain electrode, the second source electrode may include a second open portion enclosing a portion of the second drain electrode, and an open direction of the first open portion may be opposite to an open direction of the second open portion.

The method may include forming a first data line and a second data line respectively disposed on a first side and a second side of each pixel column among the pixels. With reference to a length direction of the pixel, right and left positions of the first thin film transistor and the second thin film transistor of two pixels neighboring in at least one direction of a row direction and a column direction may be opposite to each other for the two pixels. The first source electrode of one pixel of two pixels neighboring in at least one direction of a row direction and a column direction may be connected to the first data line, and the first source electrode of the other pixel may be connected to the second data line. The first data voltage and the second data voltage may have different magnitudes, and may be obtained from one image information.

DETAILED DESCRIPTION

Figure 1:
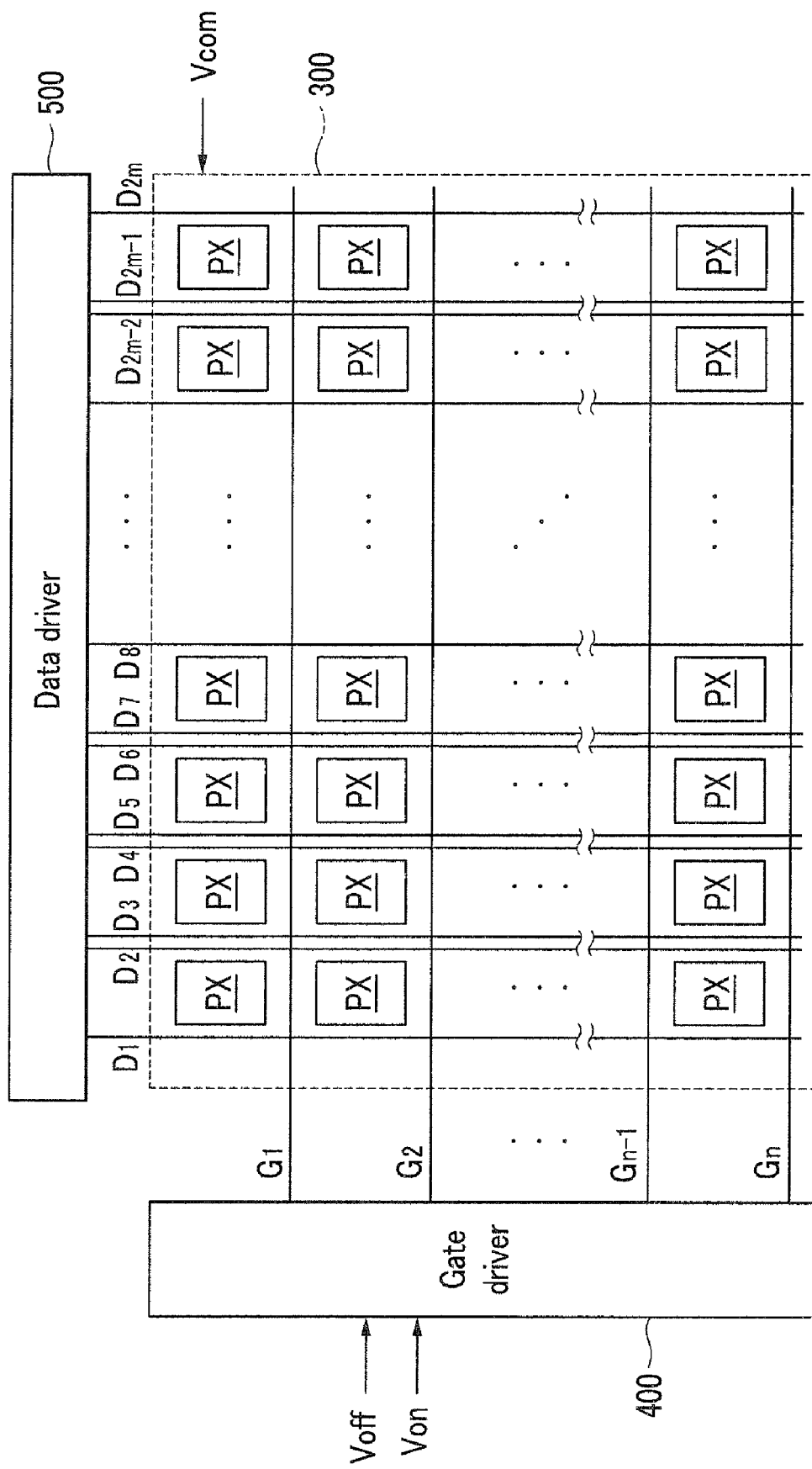
FIG. 1 is a block diagram of a liquid crystal display (LCD), according to an exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
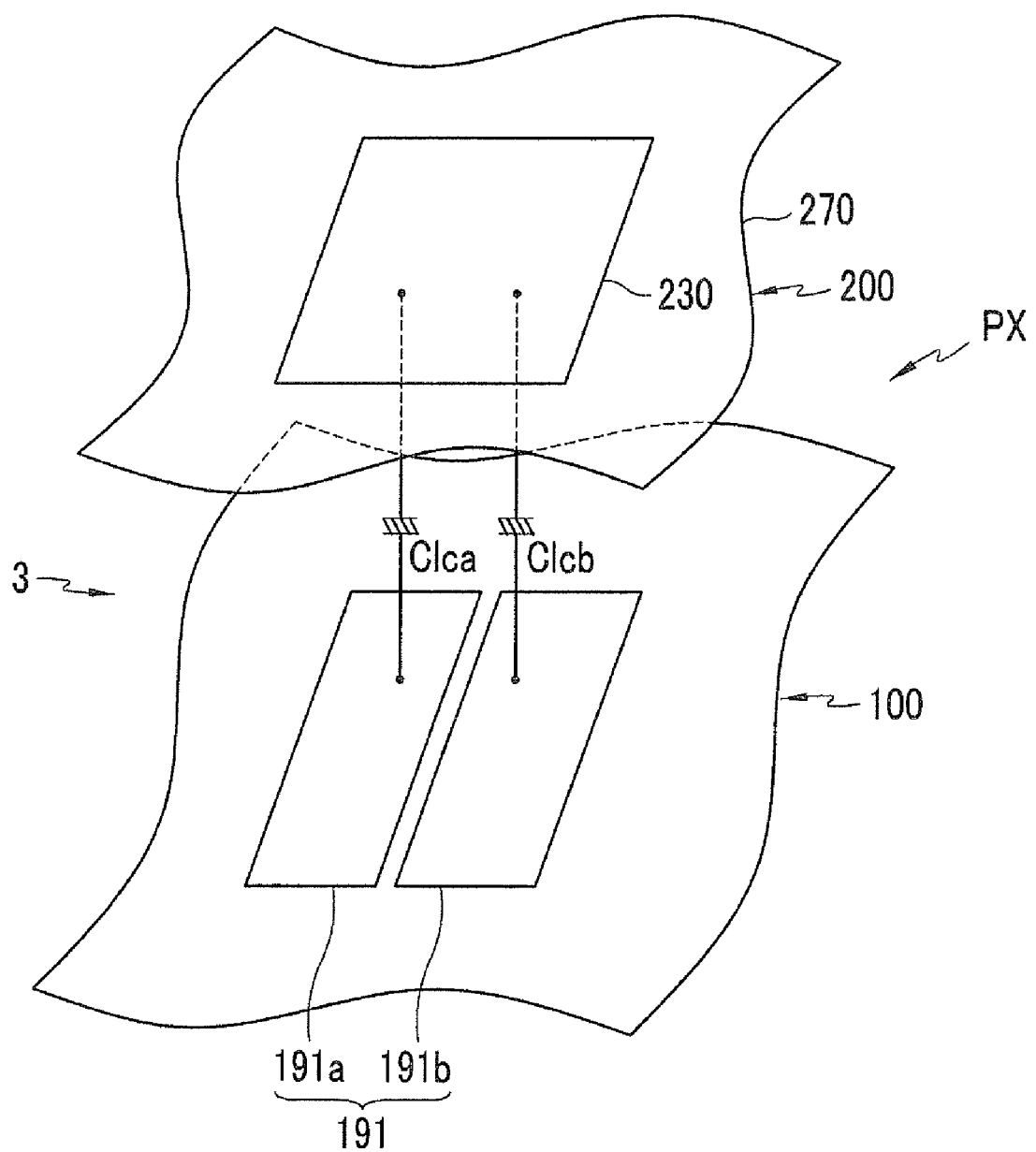
FIG. 2 is a view of one pixel in a LCD, according to an exemplary embodiment of the present invention.
Figure 3:
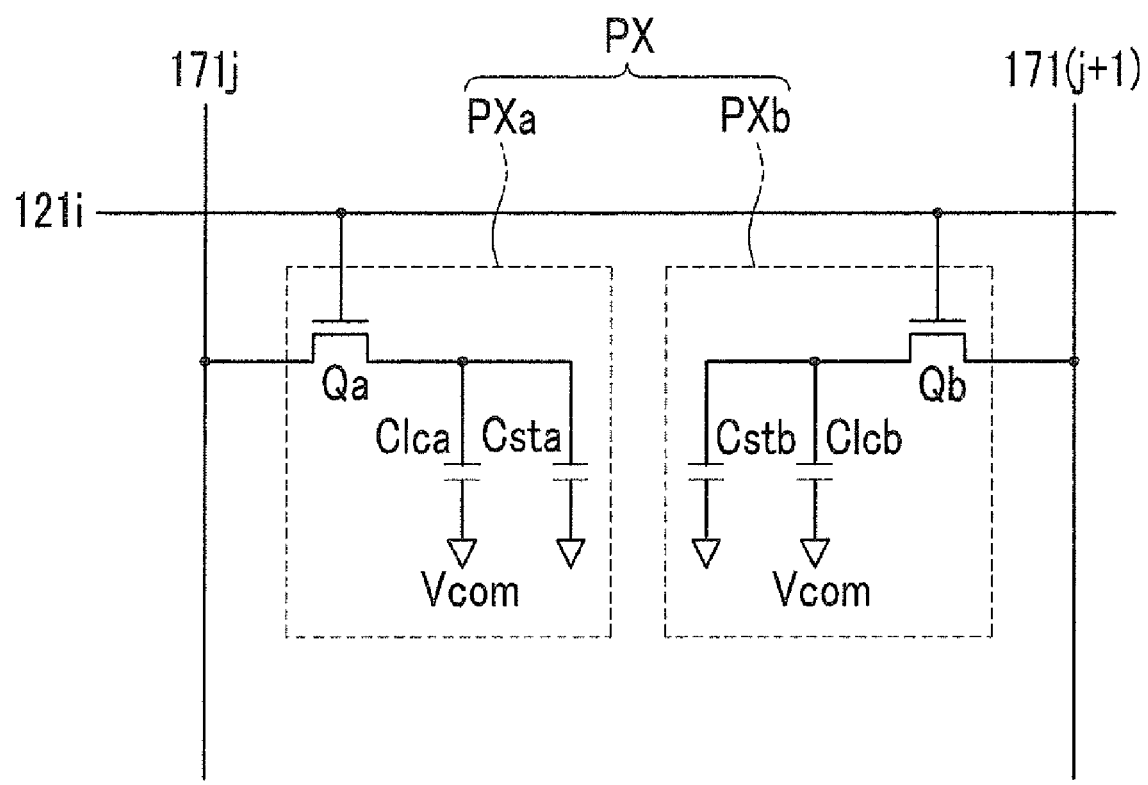
FIG. 3 is an equivalent circuit diagram of one pixel in a LCD, according to an exemplary embodiment of the present invention.

A liquid crystal display (LCD), according to exemplary embodiments of the present invention, will be described with reference to FIG. 1 to FIG. 3. FIG. 1 is a block diagram of a LCD, according to an exemplary embodiment of the present invention. FIG. 2 is a view of one pixel in a LCD, according to an exemplary embodiment of the present invention. FIG. 3 is an equivalent circuit diagram of one pixel in a LCD, according to an exemplary embodiment of the present invention.

Referring to FIG. 1, a LCD according to an exemplary embodiment of the present invention includes a liquid crystal (LC) panel assembly 300, a gate driver 400, and a data driver 500. In a view of an equivalent circuit, the display panel assembly 300 includes a plurality of signal lines G1-Gn and D1-D2$m$, and a plurality of pixels PX connected thereto and arranged substantially in a matrix. Meanwhile, in a viewpoint of the structure of FIG. 2, the LC panel assembly 300 includes a lower panel 100 and an upper panel 200 facing each other, and a LC layer 3 interposed therebetween.

The signal lines G1-Gn and D1-D2$m$ that are provided in the lower panel 100 include a plurality of gate lines G1-Gn transmitting gate signals and a plurality of data lines D1-D2$m$ transmitting data signals. The gate lines G1-Gn extend in an approximate row direction and run substantially parallel to each other, and the image data lines D1-D2$m$ extend in an approximate column direction and run substantially parallel to each other. One of the data lines D1-D2$m$ is respectively formed on both sides of one pixel PX. The signal lines may further include storage electrode lines parallel to the gate lines G1-Gn as well as the gate lines G1-Gn and the data lines D1-D2$m$.

Referring to FIG. 3, each pixel PX includes a pair of a first subpixel PXa and a second subpixel PXb. Each of the first and second subpixels PXa and PXb includes a first switching element Qa and a second switching element Qb that are connected to a corresponding gate line 121$i$ and data lines 171$j$ and 171($j$+1), and a first LC capacitor Clca and a second LC capacitor Clcb, and a first storage capacitor Csta and a second storage capacitor Cstb.

The first switching element Qa and the second switching element Qb are three terminal elements, such as a thin film transistor provided on the lower panel 100, and include a control terminal connected to the gate line 121$i$, respective input terminals connected to different data lines 171$j$ and 171($j$+1) from each other, and an output terminal respectively connected to the first LC capacitor Clca and the second LC capacitor Clcb, and the first storage capacitor Csta and the second storage capacitor Cstb.

Referring to FIG. 2, the first LC capacitor Clca uses a first subpixel electrode 191$a$ of the lower panel 100 and a common electrode 270 of the upper panel 200 as two terminals, and the LC layer 3 between the two electrodes 191$a$ and 270 functions as a dielectric material. In one aspect, the second LC capacitor Clcb uses a second subpixel electrode 191$b$ of the lower panel 100 and the common electrode 270 of the upper panel 200 as two terminals, and the LC layer 3 between the two electrodes 191a and 270 functions as a dielectric material. The common electrode 270 is formed on the whole surface of the upper panel 200 and receives a common voltage Vcom, and the first and second subpixel electrodes 191a and 191b form one pixel electrode 191.

Each of the first and second storage capacitors Csta and Cstb, respectively serving as an assistant to the first and second LC capacitors Clca and Clcb, is formed as each of the first and second subpixel electrodes 191a and 191b overlap a signal line transmitting a common voltage Vcom, with an insulator interposed therebetween. Alternatively, the first and second storage capacitors Csta and Cstb may include the first and second subpixel electrodes 191a and 191b and an adjacent gate line that is called a previous gate line, which overlaps the pixel electrode 191 via an insulator.

For color display, each pixel uniquely represents one of primary colors (i.e., spatial division) or each pixel sequentially represents the primary colors in turn (i.e., temporal division) such that a spatial or temporal sum of the primary colors is recognized as a desired color. An example of the primary colors may be three primary colors, such as red, green, and blue. FIG. 2 shows an example of the spatial division in which each pixel includes a color filter 230 representing one of the primary colors of red, green, or blue in an area of the upper panel 200 facing the pixel electrode 191. Alternatively, the color filter 230 may be provided on or under the pixel electrode 191 on the lower panel 100. In one aspect, the LC panel assembly 300 may include at least one polarizer (not shown).

Referring to FIG. 1, the gate driver 400 is connected to the gate lines G1-Gn of the LC panel assembly 300 and applies gate signals, which are a combination of a gate-on voltage Von that may turn on the first and second switching elements Qa and Qb and a gate-off voltage Voff that may turn them off, to the gate lines G1-Gn. The data driver 500 is connected to the data lines D1-D2m of the LC panel assembly 300 and applies the data voltages to the data lines D1-D2m. A signal controller (not shown) for controlling the operation of the gate driver 400 and the data driver 500 may be included.

Next, an operation of the LCD will be described. In one implementation, if input image signals and input control signals for controlling the display thereof are input from an external graphics controller (not shown), the data driver 500 applies the data voltages of the pixels of one row to the corresponding to the data lines D1-D2m according to the data control signal. The first and second subpixels PXa and PXb of one pixel PX may be applied with different data voltages that are previously set for one input image signal.

The gate driver 400 supplies a gate-on voltage Von to the gate lines G1-Gn according to a gate control signal, thereby turning on the first and second switching elements Qa and Qb connected to the gate lines G1-Gn. Then, the data voltages supplied to the data lines D1-D2m are supplied to the corresponding first and second subpixels PXa and PXb through the turned-on first and second switching elements Qa and Qb.

The difference between the data voltages applied to the first and second subpixels PXa and PXb and the common voltage Vcom is expressed as a charged voltage of the first and second LC capacitors Clca and Clcb, i.e., a pixel voltage. The arrangement of the LC molecules is changed depending on the magnitude of the pixel voltage, thereby changing the polarization of light passing through the LC layer 3. The change of the polarization is converted into a change of light transmittance by the polarizer attached to the display panels 100 and 200. Here, the voltages charged to the first and second LC capacitors Clca and Clcb of one pixel PX are different such that the lateral gamma curve maximally approximates the frontal gamma curve. In this way, the lateral visibility can be enhanced. By repeating this procedure by a unit of a horizontal period (also referred to as "1H"), the gate-on voltage Von is sequentially applied to all gate lines G1-Gn and the data voltage Vd is applied to all pixels PX, thereby displaying images for a frame.

When the next frame starts after one frame finishes, the inversion control signal RVS applied to the data driver 500 is controlled such that the polarity of the data signals applied to each pixel PX is reversed (which may be referred to as "frame inversion"). Here, the polarity of the data voltages flowing in one data line is periodically reversed during one frame according to the characteristic of the inversion signal (for example row inversion and dot inversion), or the polarity of the data voltages applied to the row of one pixel may be reversed (for example column inversion and dot inversion).

Figure 4:
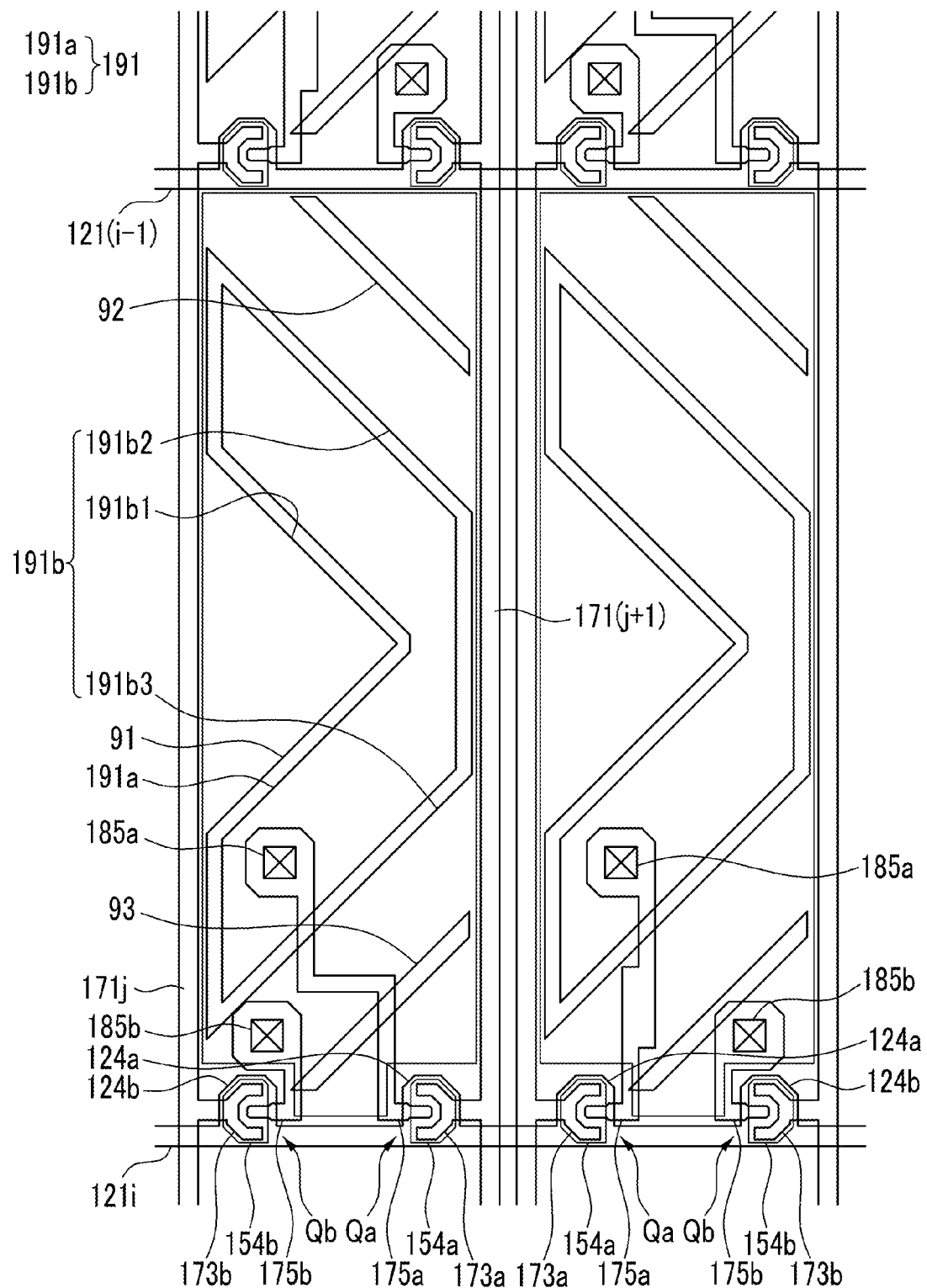
FIG. 4 is a layout view of a lower panel of a LCD, according to an exemplary embodiment of the present invention.
Figure 5:
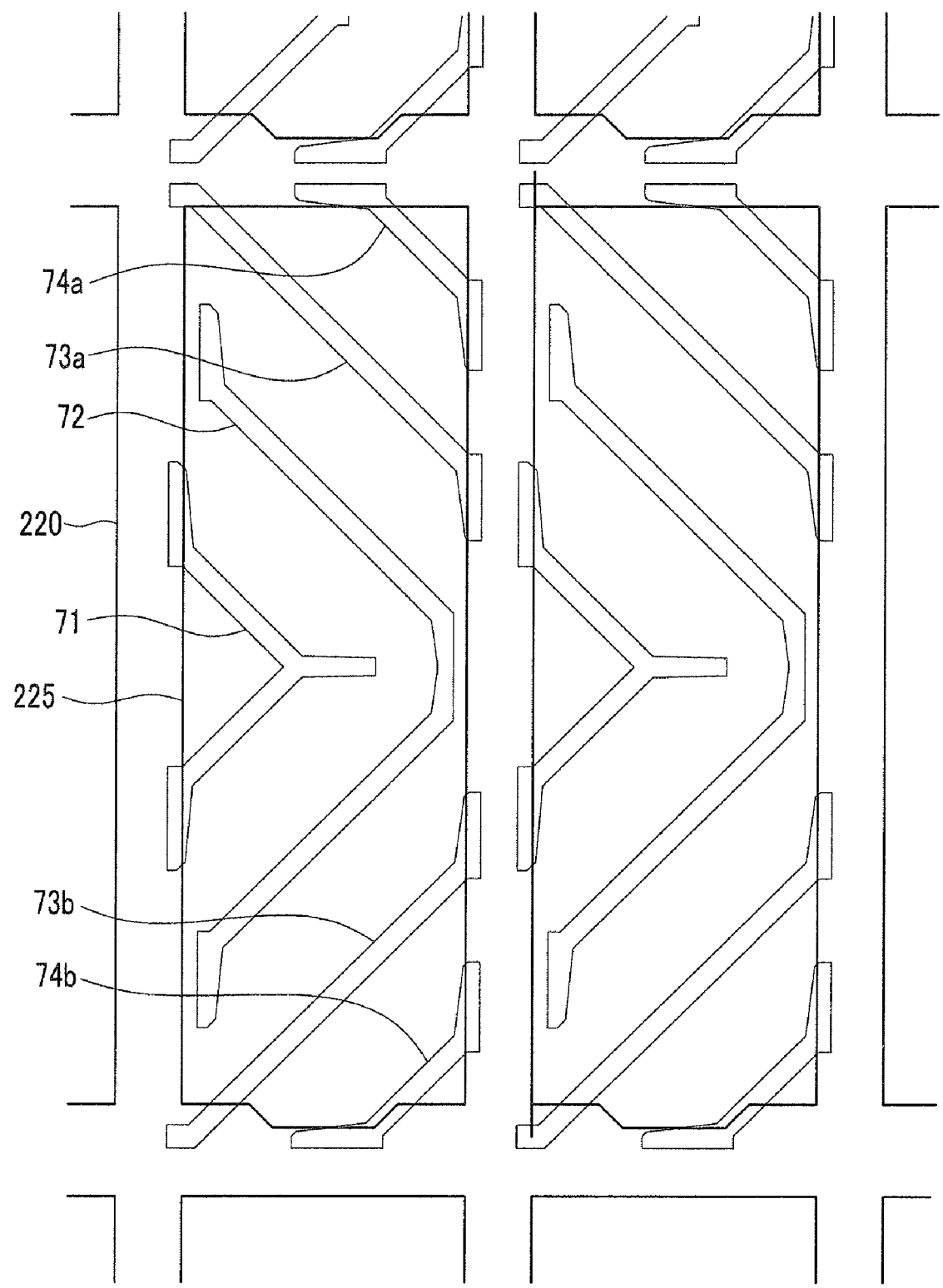
FIG. 5 is a layout view of an upper panel of a LCD, according to an exemplary embodiment of the present invention.
Figure 6:
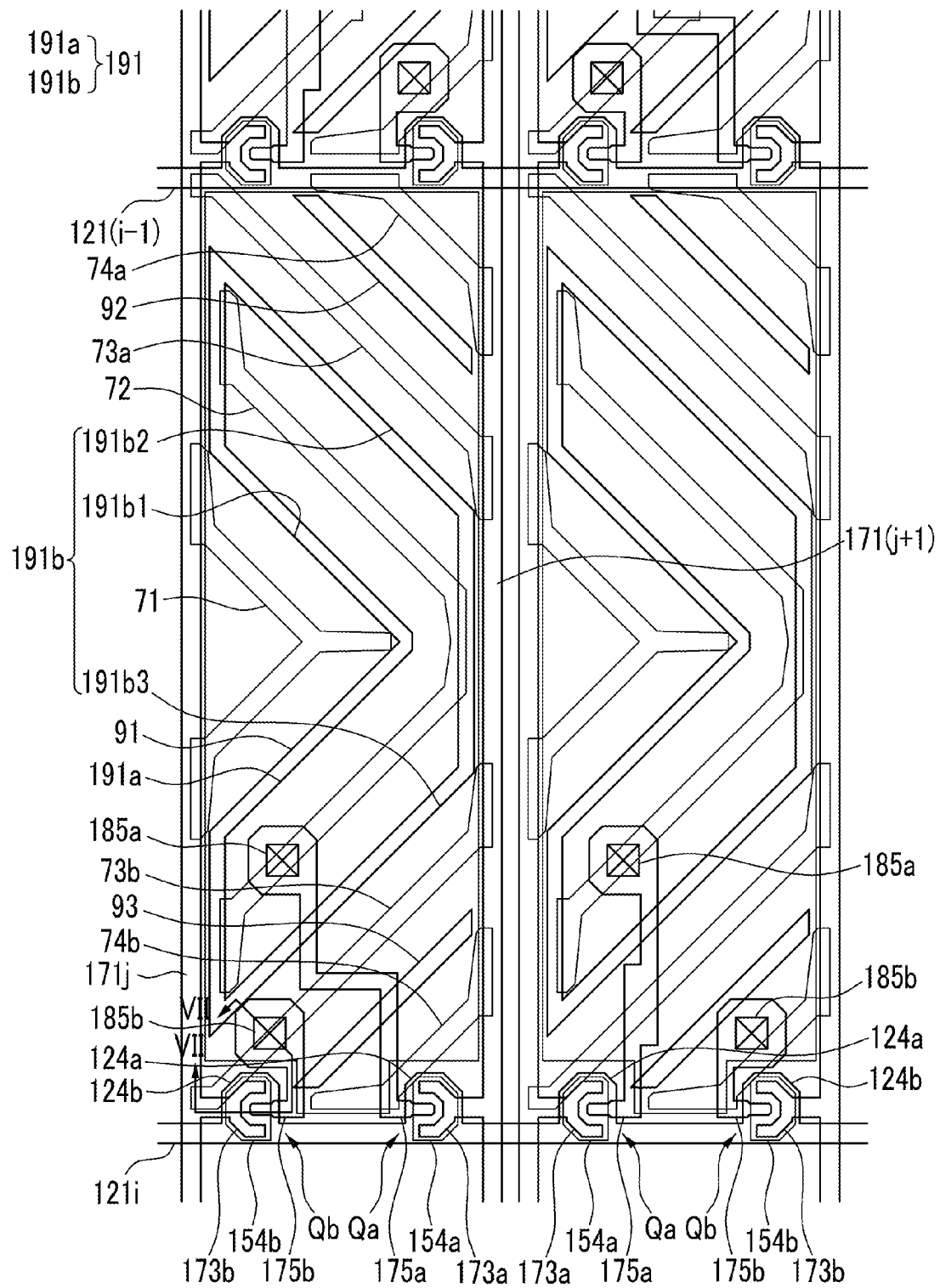
FIG. 6 is a layout view of a LCD including the lower panel of FIG. 4 and the upper panel of FIG. 5, according to an embodiment of the present invention.
Figure 7:
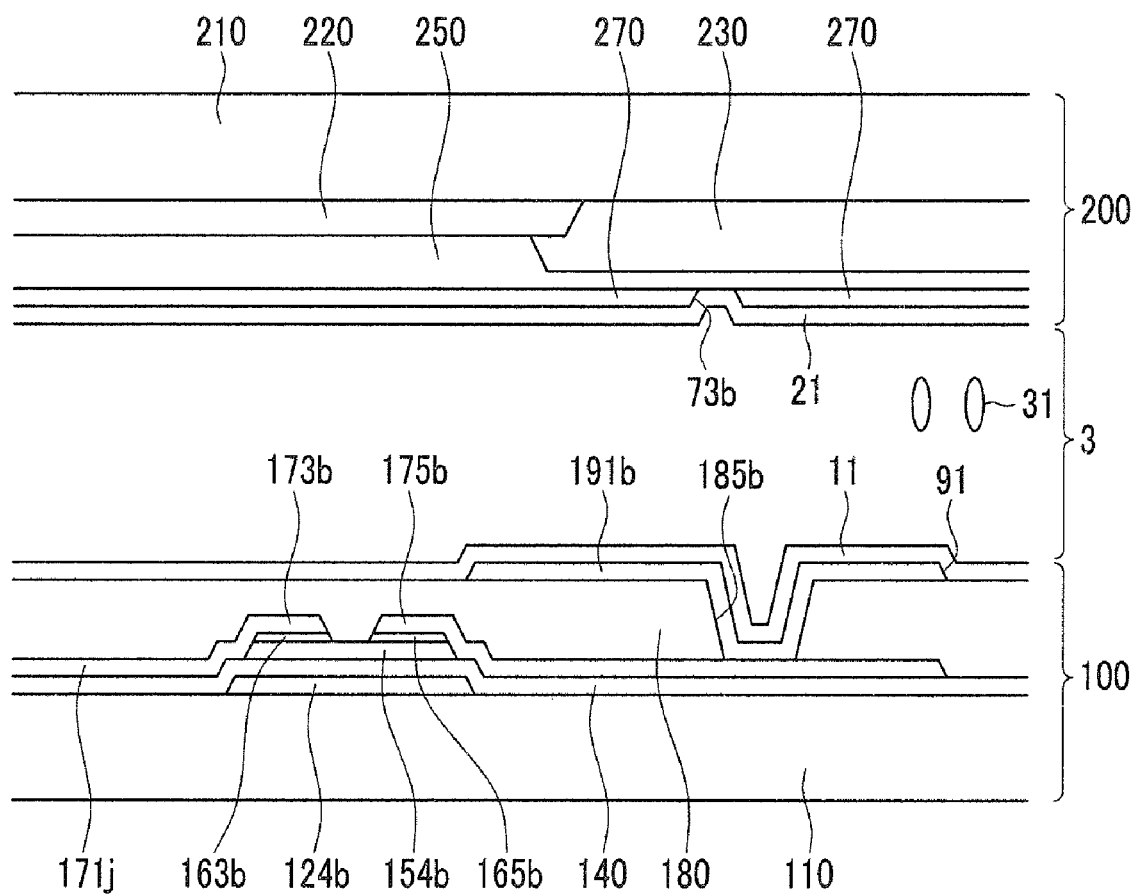
FIG. 7 is a cross-sectional view of the LCD shown in FIG. 6 taken along the line VII-VII, according to an embodiment of the present invention.

Next, the detailed structure of the LCD, according to exemplary embodiments of the present invention, will be described with reference to FIG. 4 to FIG. 7. FIG. 4 is a layout view of a lower panel of a LCD, according to an exemplary embodiment of the present invention. FIG. 5 is a layout view of an upper panel of a LCD, according to an exemplary embodiment of the present invention. FIG. 6 is a layout view of a LCD including the lower panel of FIG. 4 and the upper panel of FIG. 5. FIG. 7 is a cross-sectional view of the LCD shown in FIG. 6 taken along the line VII-VII.

Referring to FIG. 4 to FIG. 7, a LCD according to an exemplary embodiment of the present invention includes a lower panel 100 and an upper panel 200 facing each other, and a LC layer 3 interposed between the lower and upper panels 100 and 200.

The lower panel 100 will be described. A plurality of gate conductors including a plurality of gate lines $121(i-1)$ and $121i$ are formed on an insulating substrate 110. The gate lines $121(i-1)$ and $121i$ transmit gate signals and extend in a transverse direction. Each of gate lines $121(i-1)$, $121i$ includes a plurality of pairs of first and second gate electrodes 124a and 124b protruding upward. Each of the first and second gate electrodes 124a and 124b includes a pair of edges substantially perpendicular to the gate lines $121(i-1)$ and $121i$.

A gate insulating layer 140 is formed on the gate conductors. The gate insulating layer 140 may be made of an inorganic insulator such as silicon nitride (SiNx) or silicon oxide (SiOx). A plurality of pairs of first and second semiconductor islands 154a and 154b that are preferably made of amorphous silicon (a-Si) or polysilicon are formed on the gate insulating layer 140. The first and second semiconductor islands 154a and 154b are respectively disposed on the first and second gate electrodes 124a and 124b.

A pair of ohmic contact islands (not shown) are formed on each first semiconductor island 154a, and a pair of ohmic contact islands 163b and 165b are formed on each second semiconductor island 154b. The ohmic contact islands 163b and 165b may be made of a material such as n+ hydrogenated amorphous silicon in which an n-type impurity such as phosphorus is doped with a high concentration, or of silicide.

A plurality of pairs of first and second data lines $171j$ and $171(j+1)$ and a plurality of pairs of first and second drain electrodes 175a and 175b are formed on the ohmic contacts 163b and 165b and the gate insulating layer 140.

The first and second data lines $171j$ and $171(j+1)$ transmit data signals, and extend substantially in the longitudinal direction thereby intersecting the gate lines $121(i-1)$ and $121i$. The first and second data lines $171j$ and $171(j+1)$ respectively include a plurality of first and second source electrodes 173a and 173b extending toward the first and second gate electrodes 124a and 124b. Each of the first source electrode 173a and the second source electrode 173b may have a shape of the letter "C" or a reversed "C" shape, and an open portion. The open portion of the first source electrode 173a and the open portion of the second source electrode 173b may face each other. Alternatively, the first and second source electrodes 173a and 173b may have various shapes and may be variously disposed.

The first and second drain electrodes 175a and 175b are separated from each other, and are separated from the data lines 171j and 171(j+1). The first and second drain electrodes 175a and 175b respectively include a bar-shaped end portion facing the first and second source electrodes 173a and 173b with respect to the first and second gate electrodes 124a and 124b, respectively, and another end portion having a wide area. A portion of the bar-shaped end portion of the first drain electrodes 175a is enclosed by the first source electrode 173a, and overlaps the right edge of the first gate electrode 124a and may extend in the transverse direction. A portion of the bar-shaped end portion of the second drain electrodes 175b is enclosed by the second source electrode 173b, and overlaps the left edge of the second gate electrode 124b and may extend in the transverse direction. Differently from FIG. 4 to FIG. 7, the first and second drain electrodes 175a and 175b may have various shapes such as a rectangle shape, a square shape, and a bent shape.

The first/second gate electrode 124a/124b, the first/second source electrode 173a/173b, and the first/second drain electrode 175a/175b respectively constitute the first/second thin film transistor Qa/Qb together with the first/second semiconductor 154a/154b. The channel of the first/second thin film transistor Qa/Qb is formed in the first/second semiconductor 154a/154b between the first/second source electrode 173a/173b and the first/second drain electrode 175a/175b. In the present exemplary embodiment, the relative position of the first drain electrode 175a with respect to the first source electrode 173a of the first thin film transistor Qa, and the relative position of the second drain electrode 175b with respect to the second source electrode 173b of the second thin film transistor Qb are opposite to each other. For example, as shown in FIG. 4 and FIG. 6, when the first drain electrode 175a is disposed on the right side of the first source electrode 173a, the second drain electrode 175b may be disposed on the left side of the second drain electrode 175b.

The ohmic contacts 163b and 165b are formed only between the underlying semiconductors 154a and 154b and the overlying data lines 171j and 171(j+1) and the drain electrodes 175a and 175b, and reduce the contact resistance therebetween. The first and second semiconductors 154a and 154b have a portion that is exposed without being covered by the data conductors 173a, 173b, 175a, and 175b.

A passivation layer 180 is formed on the data lines 171j and 171(j+1) and the drain electrodes 175a and 175b and exposed semiconductors 154a and 154b. The passivation layer 180 may be made of the inorganic insulator such as silicon nitride or silicon oxide, an organic insulator, or an insulating material having a low dielectric constant. The dielectric constant of the organic insulator and the insulating material may be less than 4.0, and the organic insulator may have photosensitivity. The passivation layer 180 may have a planarized surface.

The passivation layer 180 has a plurality of pairs of first and second contact holes 185a and 185b exposing the wide end portions of the first and second drain electrodes 175a and 175b. A plurality of pixel electrodes 191 including a first subpixel electrode 191a and a second subpixel electrode 191b are formed on the passivation layer 180.

A pair of the first and the second subpixel electrodes 191a and 191b forming one pixel electrode 191 are separated from each other with respect to a gap 91, and the outer boundary of the pixel electrode 191 may be an approximately quadrangular shape. The second subpixel electrode 191b includes a central electrode piece 191b1 disposed beside the first subpixel electrode 191a, and an upper electrode piece 191b2 and a lower electrode piece 191b3 respectively disposed on the upper and lower sides of the first subpixel electrode 191a in a plane view. The upper electrode piece 191b2 includes an upper cutout 92, and the lower electrode piece 191b3 includes a lower cutout 93. The gap 91 and the oblique portions of the cutouts 92 and 93 may form an angle of about 45 degrees with the gate lines 121(i−1) and 121i. The pixel electrode 191 may be made of a transparent conductive material such as ITO or IZO, or a reflective metal such as aluminum, silver, or alloys thereof.

The first/second subpixel electrodes 191a/191b are physically and electrically connected to the first/second drain electrodes 175a/175b through the contact holes 185a/185b, and receive data voltages from the first/second drain electrodes 175a/175b. A pair of subpixel electrodes 191a and 191b are applied with different data voltages that are previously set for one input image signal, and the magnitudes thereof may be differently determined according to the size and the shape of the subpixel electrodes 191a and 191b. Also, areas of the first and second subpixel electrodes 191a and 191b may be different. As an example, the first subpixel electrode 191a may be applied with a higher voltage than the second subpixel electrode 191b, and may have a smaller area than the second subpixel electrode 191b.

Next, the upper panel 200 will be described. A light blocking member 220 for preventing light leakage is formed on an insulation substrate 210 made of transparent glass. The light blocking member 220 has a plurality of openings 225 facing the pixel electrodes 191 and having almost same the shape as the pixel electrodes 191.

A plurality of color filters 230 are formed on the substrate 210 and the light blocking member 220. The color filters 230 are disposed substantially in the areas enclosed by the light blocking member 220, and may extend substantially along the longitudinal direction along the pixel electrodes 191. The color filters 230 may represent one of the primary colors, such as three primary colors of red, green, and blue.

An overcoat 250 is formed on the color filters 230 and the light blocking member 220. The overcoat 250 may be made of an (organic) insulator, and prevents the color filters 230 from being exposed and provides a flat surface. The overcoat 250 may be omitted.

A common electrode 270 is formed on the overcoat 250. The common electrode 270 is preferably made of a transparent conductive material, such as ITO and IZO, and has a plurality of sets of cutouts 71, 72, 73a, 73b, 74a, 74b, as shown in FIG. 5. The oblique portions of the cutouts 71, 72, 73a, 73b, 74a, and 74b may form and angle of about 45 degrees with the gate lines 121(i−1) and 121i.

The number of cutouts 92, 93, 71, 72, 73a, 73b, 74a, and 74b may be varied depending on design factors. Alignment layers 11 and 21 are coated on the display panels 100 and 200, and may be vertical alignment layers. Polarizers (not shown) may be provided on the outer surfaces of the display panels 100 and 200.

The LC layer 3 interposed between the lower panel 100 and the upper panel 200 includes LC molecules 31 having negative dielectric anisotropy. The LC molecules 31 of the LC layer 3 are arranged such that a longitudinal axis of the LC molecules 31 may be perpendicular to the surfaces of the two panels 100 and 200 in the case that an electric field does not exist.

The first/second subpixel electrodes 191a/191b and the common electrode 270 of the upper panel 200 form the first/second LC capacitors Clca/Clcb along with the LC layer 3 therebetween such that they maintain the applied voltage after the first/second thin film transistors Qa/Qb are turned off.

If the pixel electrodes 191 are applied with the data voltages and the common electrode 270 is applied with the common voltage, an electric field that is perpendicular to two display panels 100 and 200 is generated. Thus, the LC molecules 31 of the LC layer 3 are inclined so that a long axis thereof is perpendicular to the direction of the electric field in response to the electric field, and the change degree of polarization of light incident to the LC layer 3 changes depending on the inclination degree of the LC molecules 31. On the other hand, the cutouts 92, 93, 71, 72, 73a, 73b, 74a, and 74b of the electrodes 191 and 270 and the gap 91 distort the electric field to make the components perpendicular to the edges of the cutouts 92, 93, 71, 72, 73a, 73b, 74a, and 74b, and the gap 91. Accordingly, the LC layer 3 is divided into a plurality of domains having different inclination directions of the LC molecules 31, thereby widening the reference viewing angle.

Figure 8:
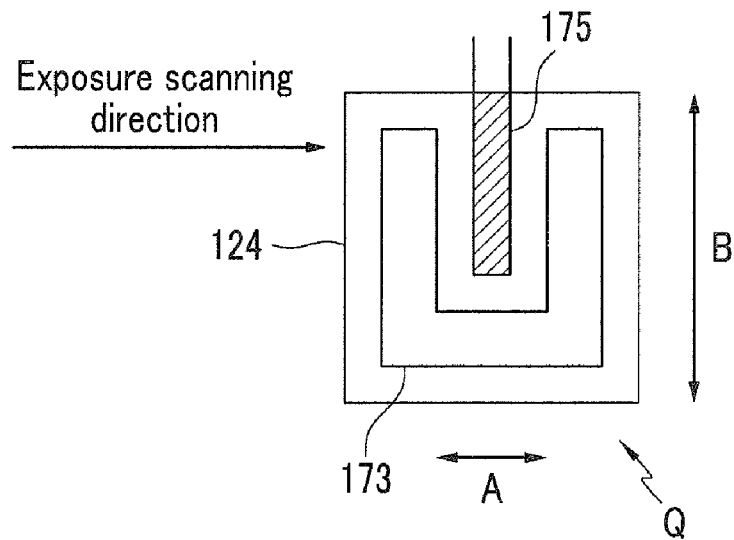
FIG. 8 and FIG. 9 are views respectively showing a change of an alignment error of a thin film transistor according to a scanning direction of a light exposer, according to embodiments of the present invention.
Figure 9:
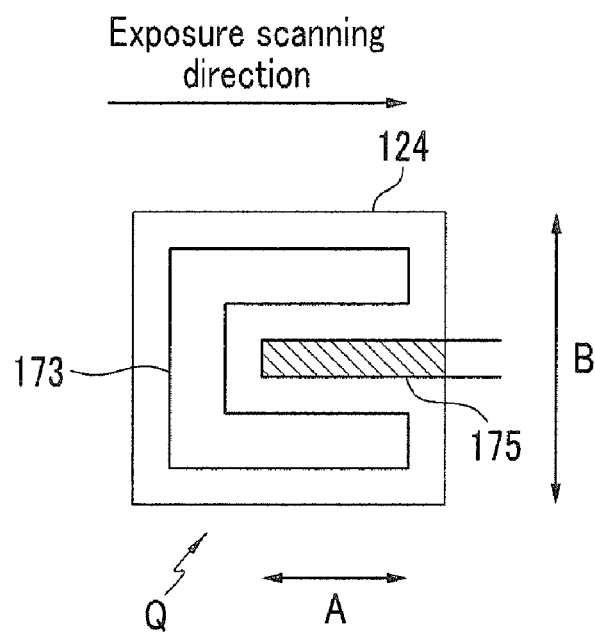
Figure 10:
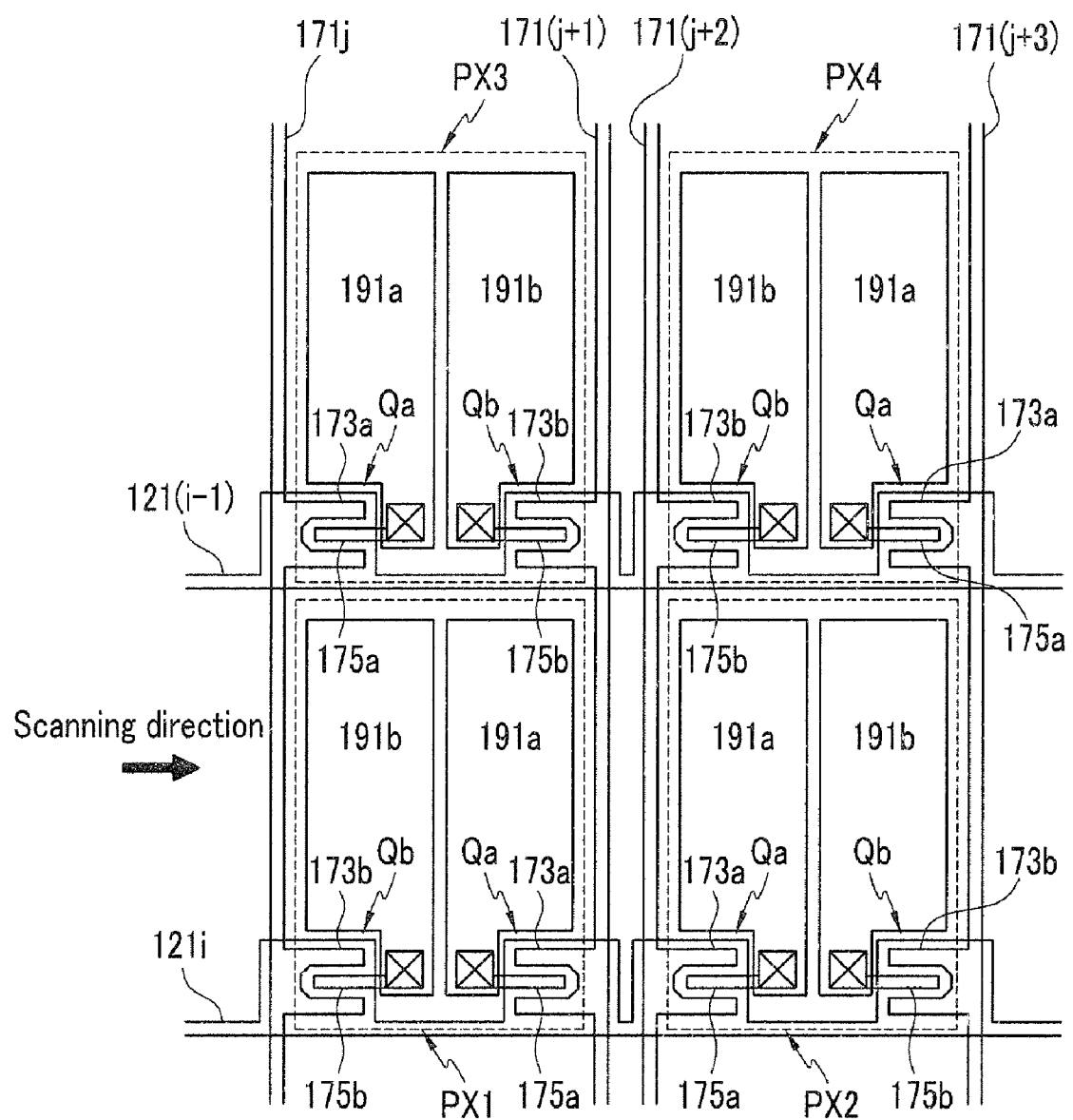
FIG. 10 is a layout view showing four pixels and a subpixel of each pixel in a LCD, according to an exemplary embodiment of the present invention.

Next, the arrangement and the shape of the thin film transistors Qa and Qb included in the various pixels of the LCD, according to exemplary embodiments of the present invention will be described with reference to FIG. 8 to FIG. 10. FIG. 8 and FIG. 9 are views respectively showing a change of an alignment error of a thin film transistor according to a scanning direction of a light exposer. FIG. 10 is a layout view showing four pixels PX1, PX2, PX3, and PX4 and the first and second subpixels PXa and PXb of each of the pixels PX1, PX2, PX3, and PX4 in a LCD, according to an exemplary embodiment of the present invention.

Referring to FIG. 10, a LCD, according to an exemplary embodiment of the present invention, includes a plurality of pixels PX1, PX2, PX3, and PX4 arranged in a matrix form, a plurality of gate lines 121(i−1) and 121i, and a plurality of pairs of data lines 171j, 171(j+1), 171(j+2), and 171(j+3), and each of the pixels PX1, PX2, PX3, and PX4 includes first and second thin film transistors Qa and Qb and a pair of the first and second subpixel electrodes 191a and 191b connected to the first and second thin film transistors Qa and Qb, respectively.

The position relationships (e.g., right and left position relationships) of the first and second thin film transistors Qa and Qb of two pixels PX1, PX2, PX3, and PX4 neighboring in the column direction or the row direction may be opposite to each other for the two pixels PX1, PX2, PX3, and PX4. That is, the first thin film transistor Qa of the pixel PX1 is connected to the data line 171(j+1) disposed on the right side thereof and the second thin film transistor Qb is connected to the data line 171j disposed on the left side thereof, but the first thin film transistor Qa of the pixel PX3/PX2 neighboring in the column/row directions with respect to the pixel PX1 is connected to the data line 171j/171(j+2) disposed on the left side thereof and the second thin film transistor Qb is connected to the data line 171(j+1)/171(j+3) disposed on the right sides. That is, the first and second thin film transistors Qa and Qb are alternately connected to one of the data line 171j, 171(j+1), 171(j+2), and 171(j+3), while two first thin film transistors Qa and two second thin film transistors Qb are alternately connected to one of the gate lines 121(i−1) and 121i.

In one aspect, the shape of the first thin film transistor Qa and the shape of the second thin film transistor Qb may be opposite to each other in each of the pixels PX1, PX2, PX3, and PX4. That is, in each of the pixels PX1, PX2, PX3 and PX4, the relative position of the first drain electrode 175a with respect to the first source electrode 173a of the first thin film transistor Qa may be opposite to the relative position of the second drain electrode 175b with respect to the second source electrode 173b of the second thin film transistor Qb.

For example, as shown in FIG. 10, the right and left position relationship of the first source electrode 173a and the first drain electrode 175a, and the right and left position relationship of the second source electrode 173b and the second drain electrode 175b are opposite to each other with reference to the length direction of each of the pixels PX1, PX2, PX3, and PX4. The open portions of the first and second source electrodes 173a and 173b may be disposed in the opposite directions to each other, and may face each other in each of the pixels PX1, PX2, PX3, and PX4.

Alternatively, the open direction of the open portions of the first source electrode 173a and the second source electrode 173b in each of the pixels PX1, PX2, PX3, and PX4 may be the same. That is, the open portions of the first source electrode 173a and the second source electrode 173b in each of the pixels PX1, PX2, PX3, and PX4 may be all toward the right direction or left direction. For example, the second source electrode 173b of the pixel PX3 shown in FIG. 10 may be open toward the right direction. In this case, the second source electrode 173b is farther from the data line 171(j+1) than the second drain electrode 175b such that the data line 171(j+1) must be bent inside to be connected to the second source electrode 173b. Thus, delay degree of data signals of two data lines 171j and 171(j+1) are different from each other, and deterioration of display quality due to cross-talk between the data line 171(j+1) bent inside of the pixel PX3 and the second subpixel electrode 191b may be generated.

However, as shown in FIG. 10, if the shapes of the first thin film transistor Qa and the second thin film transistor Qb of each of the pixels PX1, PX2, PX3, and PX4 are opposite to each other, signal delay of the data lines 171j, 171(j+1), 171(j+2), and 171(j+3) may be the same, and degradation of display quality due to cross-talk may be prevented. In one aspect, it may not be necessary for the data lines 171j, 171(j+1), 171(j+2), and 171(j+3) to be bent inside the pixels PX1, PX2, PX3, and PX4, and thereby reduction of the opening ratio may be reduced.

Referring to FIG. 10, the open directions of the open portions of the first source electrode 173a of the first thin film transistor Qa are opposite to each other among neighboring pixels PX1, PX2, PX3, and PX4, and the same are the open directions of the open portions of the second source electrode 173b of the second thin film transistor Qb.

Differently from FIG. 10, the right and left arrangement of the first subpixel electrodes 191a and the second subpixel electrode 191b may be the same per each pixel PX1, PX2, PX3, and PX4, as shown in FIG. 4, FIG. 5 and FIG. 6. In one aspect, the LCD shown in FIG. 10 may have the same structure as the LCD shown in FIG. 4 to FIG. 7.

In the exemplary embodiment shown in FIG. 4 to FIG. 7 and FIG. 10, the process for forming the conductors such as the gate lines 121(i−1) and 121i, the data lines 171j, 171(j+1), 171(j+2), and 171(j+3) including the source electrodes 173a and 173b (here, 171(j+2) and 171(j+3) are only shown in FIG. 10), and the drain electrodes 175a and 175b may include depositing a conductive material layer on a substrate and forming a photosensitive film pattern thereon. The forming of the photosensitive film pattern includes coating a photosensitive film on the deposited conductive material layer and exposing the photosensitive film to light using a photomask.

In the light exposing of the photosensitive film, the substrate may be scanned and exposed to light by a light exposer.

In a manufacturing method of the LCD, according to an exemplary embodiment of the present invention, the scanning direction of the light exposer may be parallel to the gate lines 121($i$−1) and 121$i$ as shown in FIG. 10. Here, in one aspect, the extension direction of the bar-shape end portion of the first and second drain electrodes 175$a$ and 175$b$ of the first and second thin film transistors Qa and Qb may also be parallel to the scanning direction of the light exposer.

On the other hand, when scanning is conducted by the light exposer, a non-linear irregular error may be generated in the scanning direction such that an alignment error of the conductors to be patterned may be generated. The error of the scanning direction may be larger in the direction perpendicular to the scanning direction than the direction parallel to the scanning direction. Accordingly, if the thin film transistors Q are arranged as shown in FIG. 8, the alignment error B in the direction perpendicular to the scanning direction of the light exposer is larger than the alignment error A in the direction parallel to the scanning direction, such that the changing amount of the overlapping area of the drain electrode 175 and the gate electrode 124 is increased. However, if the thin film transistors Q are arranged as shown in FIG. 9, the alignment error A in the direction parallel to the scanning direction of the light exposer is smaller than the alignment error B in the direction perpendicular to the scanning direction, such that the changing amount of the overlapping area of the drain electrode 175 and the gate electrode 124 is small. Here, the reference number 173 FIG. 8 and FIG. 9 indicates a source electrode enclosing the drain electrode 175.

Accordingly, like the exemplary embodiments of FIG. 4 to FIG. 7 and FIG. 10, the first and second drain electrodes 175$a$ and 175$b$ extend in the transverse direction which is parallel to the scanning direction of the light exposer, such that the first and second drain electrodes 175$a$ and 175$b$ overlap the right and left edges of the first and second gate electrodes 124$a$ and 124$b$, and thereby, the changing amount of the overlapping area between the first and second drain electrodes 175$a$ and 175$b$ and the first and second gate electrodes 124$a$ and 124$b$ may be reduced even when an error is generated in the scanning direction of the light exposer. That is, the boundary line between the portion at which the first and second drain electrodes 175$a$ and 175$b$ overlap the first and second gate electrodes 124$a$ and 124$b$ and the portion at which the first and second drain electrodes 175$a$ and 175$b$ do not overlap the first and the second gate electrodes 124$a$ and 124$b$ is perpendicular to the scanning direction of the light exposer, and thereby, the changing amount of the overlapping area between the first and second drain electrodes 175$a$ and 175$b$ and the first and second gate electrodes 124$a$ and 124$b$ may be reduced although an error in the scanning direction of the light exposer is generated. Differently from FIG. 4 to FIG. 7 and FIG. 10, an acute angle between the boundary line between the portion at which the first and second drain electrodes 175$a$ and 175$b$ overlap the first and second gate electrodes 124$a$ and 124$b$ and the portion at which the first and second drain electrodes 175$a$ and 175$b$ do not overlap the first and second gate electrode 124$a$ and 124$b$, and the scanning direction of the light exposer, may be more than 45 degrees and equal to or less than 90 degrees.

In this way, if the changing amount of the overlapping area between the first and second drain electrodes 175$a$ and 175$b$ and the first and the second gate electrodes 124$a$ and 124$b$ may be reduced, the changing amount and deviation of kick-back voltages, which lower data voltages applied to the first and second subpixel electrodes 191$a$ and 191$b$ due to parasitic capacitances between the first and second drain electrodes 175$a$ and 175$b$ and the first and second gate electrodes 124$a$ and 124$b$, may also be reduced. Accordingly, change of the kick-back voltage due to a non-linear error in the direction perpendicular to the scanning direction of the light exposer may be reduced such that display deterioration such as horizontal stripe stains may be reduced.

Next, change of the data voltages of the first and second subpixel electrodes 191$a$ and 191$b$ when an alignment error of the gate lines 121($i$−1) and 121$i$ and the data lines 171$j$, 171($j$+1), 171($j$+2), and 171($j$+3) (here, 171($j$+2) and 171($j$+3) are shown in FIG. 10) or the drain electrodes 175$a$ and 175$b$ is generated under a manufacturing process in the exemplary embodiments of FIG. 10, or FIG. 4 to FIG. 7 will be described with reference to FIG. 11 to FIG. 14 as well as FIG. 10.

Figure 11:
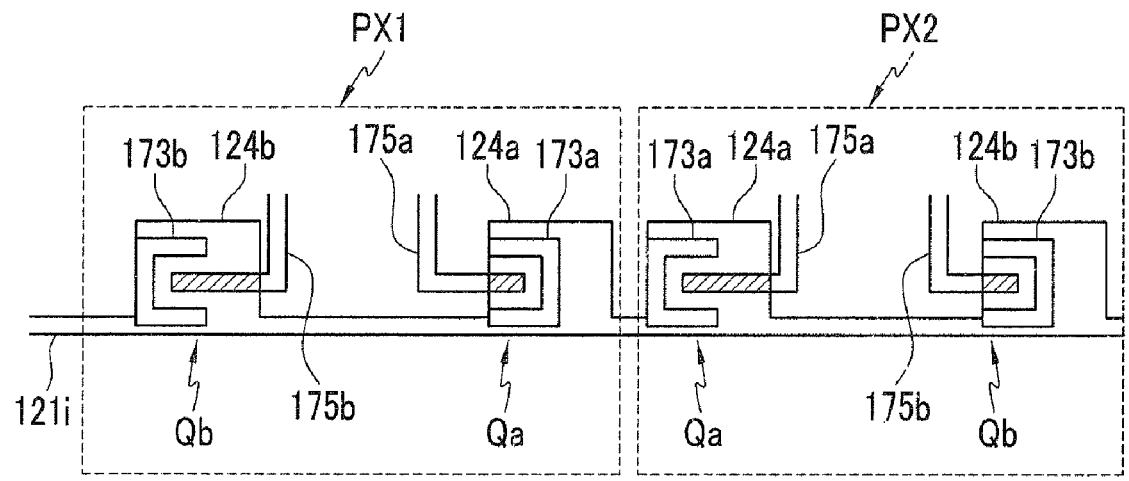
FIG. 11 is a layout view of a thin film transistor portion of two pixels in a LCD, according to an exemplary embodiment of the present invention.
Figure 12:
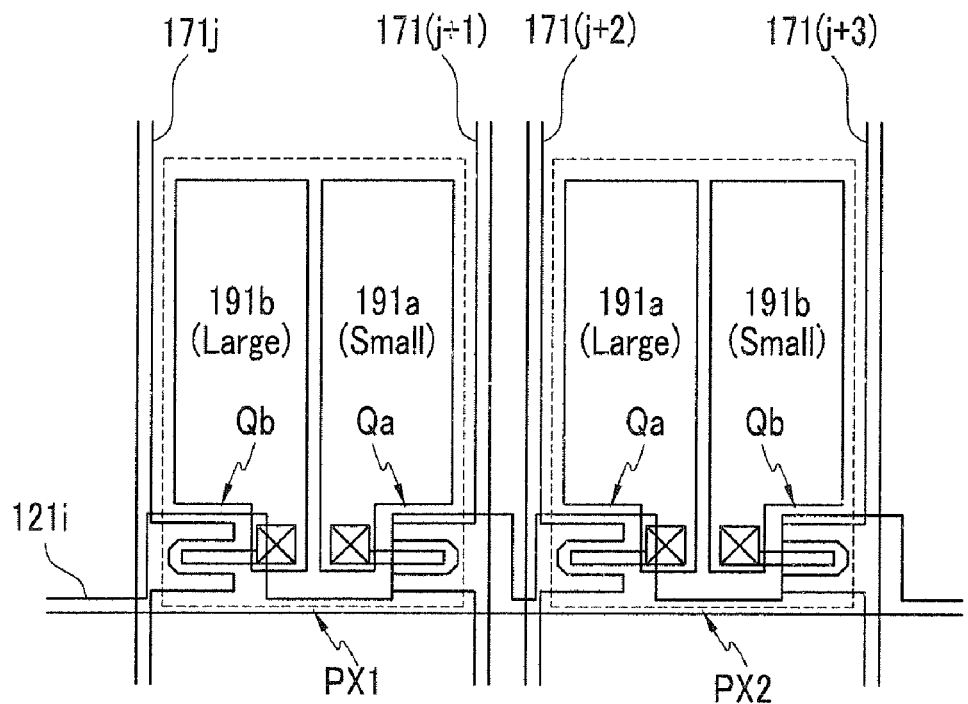
FIG. 12 shows a changing amount of a kick-back voltage for two pixels of a LCD, according to an exemplary embodiment of the present invention.
Figure 13:
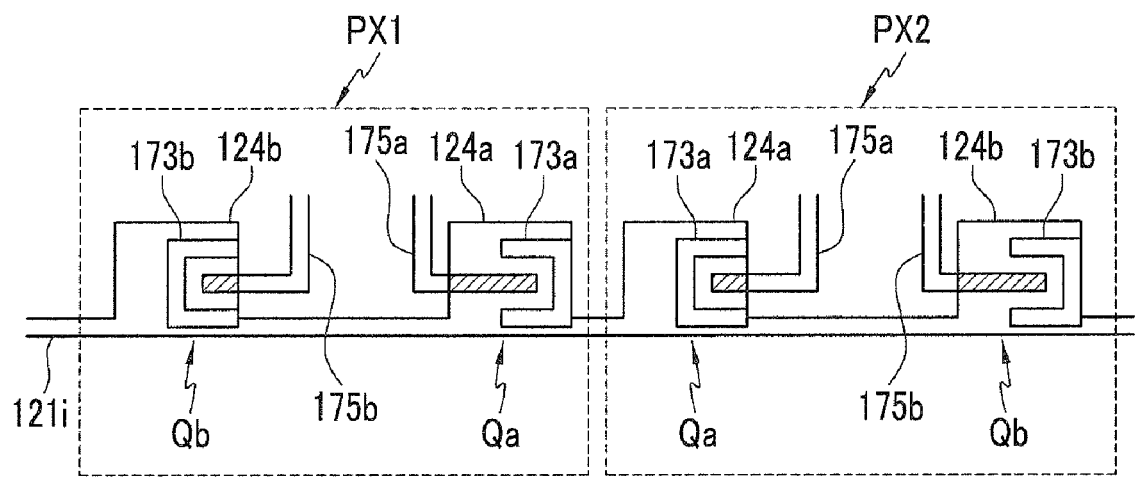
FIG. 13 is a layout view of a thin film transistor portion of two pixels in a LCD, according to an exemplary embodiment of the present invention.
Figure 14:
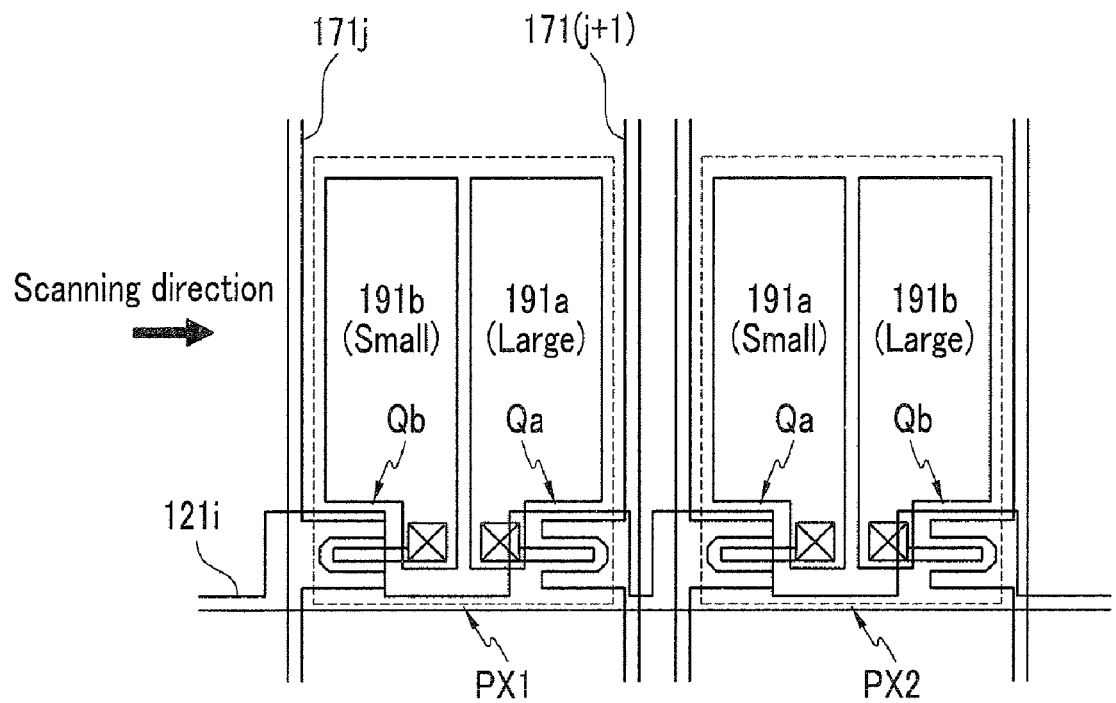
FIG. 14 shows a changing amount of a kick-back voltage for two pixels of a LCD, according to an exemplary embodiment of the present invention.

FIG. 11 and FIG. 13 are layout views of a thin film transistor portion of two pixels in a LCD, according to an exemplary embodiment of the present invention. FIG. 12 and FIG. 14 show a changing amount of a kick-back voltage for two pixels of a LCD, according to an exemplary embodiment of the present invention.

Referring to FIG. 11 and FIG. 12, when the gate line 121$i$ including the first and second gate electrodes 124$a$ and 124$b$ is biased toward the right side, the overlapping area between the first gate electrode 124$a$ and the first drain electrode 175$a$ in the pixel PX1 is decreased such that the kick-back voltage is also decreased, and the overlapping area between the first gate electrode 124$a$ and the first drain electrode 175$a$ in the neighboring pixel PX2 is increased such that the kick-back voltage is increased. Accordingly, the changing amounts of the data voltages applied to the first subpixel electrodes 191$a$ of the neighboring pixels PX1 and PX2 due to kick-back voltages may be offset. Also, when the gate line 121$i$ is biased toward the right side, the overlapping area between the second gate electrode 124$b$ and the second drain electrode 175$b$ in the pixel PX1 is increased such that the kick-back voltage is increased, and the overlapping area between the second gate electrode 124$b$ and the second drain electrode 175$b$ in the neighboring pixel PX2 is decreased such that the kick-back voltage is also decreased. Accordingly, the changing amounts of the data voltages applied to the second subpixel electrodes 191$b$ of the neighboring pixels PX1 and PX2 due to kick-back voltages may be offset.

In FIG. 13 and FIG. 14 which are opposite to FIG. 11 and FIG. 12, the gate line 121$i$ including the first and second gate electrodes 124$a$ and 124$b$ is biased toward the left side. In the present exemplary embodiment, the changing amounts of the kick-back voltages are respectively opposite to those of the cases of FIG. 11 and FIG. 12, and the changing amounts of the data voltages applied to the first and second subpixel electrodes 191$a$ and 191$b$ of two pixels PX1 and PX2 neighboring in the row direction may be offset.

In this way, changes of the kick-back voltages of the first subpixel electrodes 191$a$ applied with a relatively higher voltage is offset and changes of the kick-back voltages of the second subpixel electrodes 191$b$ applied with a relative lower voltage is offset in the neighboring pixels PX1 and PX2, such that although deviations of the alignment of constituent elements such as the gate lines 121($i$−1) and 121$i$ are generated under a manufacturing process, display deterioration such as horizontal stripe stains due to changes of the kick-back voltages may be reduced.

According to an exemplary embodiment of the present invention, a changing amount and deviation of kick-back voltages are reduced such that display deterioration such as horizontal stripe stains may be reduced. According to another exemplary embodiment of the present invention, changes of the kick-back voltages of the neighboring pixels are offset with each other such that although deviation of the alignment of the constituent elements are generated under a manufacturing process of the LCD, display deterioration such as horizontal stripe stains due to a change in kick-back voltages may be reduced.

While embodiments of this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a plurality of gate lines including gate line, a second gate line and a third gate line each extending in a first direction;
    a plurality of data lines including a first data line and a second data line each extending in a second direction orthogonal to the first direction;
    a first pixel formed between the first gate line, the second gate line, the first data line and the second data line, and having a first subpixel configured to have applied thereto a first data voltage and a second subpixel configured to have applied thereto a second data voltage lower than the first data voltage;
    a second pixel formed between the second gate line, the third gate line, the first data line and the second data line, and having a third subpixel configured to have applied thereto a third data voltage and a fourth subpixel configured to have applied thereto a fourth data voltage lower than the third data voltage,
    wherein the first subpixel and the third subpixel are connected to a first thin film transistor and a third thin film transistor respectively, the first thin film transistor and the third thin film transistor have source electrodes connected to the first data line and the second data line respectively, and each of the source electrodes has an open portion surrounding a portion of a drain electrode, and
    wherein an open direction of the source electrode of the first thin film transistor is opposite to an open direction of the source electrode of the third thin film transistor.

2. The liquid crystal display of claim 1, wherein the second subpixel and the fourth subpixel are connected to a second thin film transistor and a fourth thin film transistor respectively, the second thin film transistor and the fourth thin film transistor have source electrodes connected to the second data line and the first data line respectively, and each of the source electrodes has an open portion surrounding a portion of a drain electrode, and
    wherein an open direction of the source electrode of the second thin film transistor is opposite to an open direction of the source electrode of the fourth thin film transistor.

3. The liquid crystal display of claim 2, wherein the open direction of the source electrode of the first thin film transistor is opposite to the open direction of the source electrode of the second thin film transistor, and
    wherein the open direction of the source electrode of the third thin film transistor is opposite to the open direction of the source electrode of the fourth thin film transistor.

4. A liquid crystal display comprising:
    a plurality of gate lines including a first gate line and a second gate line each extending in a first direction;
    a plurality of data lines including a first data line, a second data line, a third data line and a fourth data line each extending in a second direction orthogonal to the first direction;
    a first pixel formed between the first gate line, the second gate line, the first data line and the second data line, and having a first subpixel configured to have applied thereto a first data voltage and a second subpixel configured to have applied thereto a second data voltage lower than the first data voltage;
    a second pixel formed between the first gate line, the second gate line, the third data line and the fourth data line, and having a third subpixel configured to have applied thereto a third data voltage and a fourth subpixel configured to have applied thereto a fourth data voltage lower than the third data voltage,
    wherein the first subpixel and the third subpixel are connected to a first thin film transistor and a third thin film transistor respectively, the first thin film transistor and the third thin film transistor have source electrodes connected to the second data line and the third data line respectively, and each of the source electrodes has an open portion surrounding a portion of a drain electrode, and
    wherein an open direction of the source electrode of the first thin film transistor is opposite to an open direction of the source electrode of the third thin film transistor.

5. The liquid crystal display of claim 4, wherein the second subpixel and the fourth subpixel are connected to a second thin film transistor and a fourth thin film transistor respectively, the second thin film transistor and the fourth thin film transistor have source electrodes connected to the first data line and the fourth data line respectively, and each of the source electrodes has an open portion surrounding a portion of a drain electrode, and
    wherein an open direction of the source electrode of the second thin film transistor is opposite to an open direction of the source electrode of the fourth thin film transistor.

6. The liquid crystal display of claim 5, wherein the open direction of the source electrode of the first thin film transistor is opposite to the open direction of the source electrode of the second thin film transistor, and
    wherein the open direction of the source electrode of the third thin film transistor is opposite to the open direction of the source electrode of the fourth thin film transistor.

7. The liquid crystal display of claim 6, wherein the second data line and the third data line are positioned between the first pixel and the second pixel.

8. The liquid crystal display of claim 4, wherein the second data line and the third data line are positioned between the first pixel and the second pixel.

9. A liquid crystal display comprising:
    a plurality of gate lines including a first gate line, a second gate line and a third gate line each extending in a first direction;
    a plurality of data lines including a first data line, a second data line, a third data line and a fourth data line each extending in a second direction orthogonal to the first direction;
    a first pixel formed between the first gate line, the second gate line, the first data line and the second data line, and having a first subpixel configured to have applied thereto a first data voltage and a second subpixel configured to have applied thereto a second data voltage lower than the first data voltage;

a second pixel formed between the second gate line, the third gate line, the first data line and the second data line, and having a third subpixel configured to have applied thereto a third data voltage and a fourth subpixel configured to have applied thereto a fourth data voltage lower than the third data voltage;

a third pixel formed between the first gate line, the second gate line, the third data line and the fourth data line, and having a fifth subpixel configured to have applied thereto a fifth data voltage and a sixth subpixel configured to have applied thereto a sixth data voltage lower than the fifth data voltage, wherein the first, third and fifth subpixels are connected to first, third and fifth thin film transistors respectively, the first, third and fifth thin film transistors have source electrodes connected to the first, second and fourth data lines respectively, and each of the source electrodes has an open portion surrounding a portion of a drain electrode, and wherein an open direction of the source electrode of the first thin film transistor is opposite to an open direction of the source electrode of the third thin film transistor, and wherein the open direction of the source electrode of the first thin film transistor is opposite to an open direction of the source electrode of the fifth thin film transistor.

10. The liquid crystal display of claim 9, wherein the second, fourth and sixth subpixels are connected to second, fourth and sixth thin film transistors respectively, the second, fourth and sixth thin film transistors have source electrodes connected to the second, first, and third data lines respectively, and each of the source electrodes has an open portion surrounding a portion of a drain electrode, and wherein an open direction of the source electrode of the second thin film transistor is opposite to an open direction of the source electrode of the fourth thin film transistor, and wherein the open direction of the source electrode of the second thin film transistor if opposite to an open direction of the source electrode of the sixth thin film transistor.

11. The liquid crystal display of claim 10, wherein the open direction of the source electrode of the first thin film transistor is opposite to the open direction of the source electrode of the second thin film transistor, wherein the open direction of the source electrode of the third thin film transistor is opposite to the open direction of the source electrode of the fourth thin film transistor, and wherein the direction of the source electrode of the fifth thin film transistor is opposite to the open direction of the source electrode of the sixth thin film transistor.

12. The liquid crystal display of claim 10, wherein the second data line and the third data line are positioned between the first pixel and the third pixel.

13. The liquid crystal display of claim 11, wherein the second data line and the third data line are positioned between the first pixel and the third pixel.

* * * * *